United States Patent [19]

Dummersdorf et al.

[11] Patent Number: 5,645,614
[45] Date of Patent: Jul. 8, 1997

[54] PROCESS FOR THE UTILIZATION OF SEWAGE SLUDGES

[75] Inventors: Hans-Ulrich Dummersdorf, Burscheid; Günther Herbst, Odenthal; Manfred Erken, Bergheim; Franz-Josef Menge, Pulheim; Helmut Kreusing, Aachen, all of Germany

[73] Assignees: Bayer Aktiengesellschaft, Leverkusen; Rheinbraun Aktiengesellschaft, Cologne, both of Germany

[21] Appl. No.: 302,576

[22] Filed: Sep. 8, 1994

[30] Foreign Application Priority Data

Sep. 13, 1993 [DE] Germany ............ 43 30 884.8

[51] Int. Cl.$^6$ ............................................. C10L 5/06
[52] U.S. Cl. .............. 44/596; 44/589; 100/37; 100/38; 264/117; 264/319; 210/770
[58] Field of Search ............ 100/37, 38; 264/109, 264/117, 166, 319; 44/552, 589, 591, 594, 596; 210/770, 774

[56] References Cited

U.S. PATENT DOCUMENTS

| | | |
|---|---|---|
| 3,847,803 | 11/1974 | Fisk . |
| 3,910,775 | 10/1975 | Jackman . |
| 4,152,119 | 5/1979 | Schulz . |
| 4,165,971 | 8/1979 | Kaimann et al. . |
| 4,225,457 | 9/1980 | Schulz . |
| 4,306,978 | 12/1981 | Wurtz . |
| 4,496,365 | 1/1985 | Lindemann . |
| 4,671,881 | 6/1987 | Itoh . |
| 4,710,298 | 12/1987 | Noda et al. . |
| 5,125,931 | 6/1992 | Schulz . |
| 5,431,702 | 7/1995 | Schulz ........... 44/552 |

FOREIGN PATENT DOCUMENTS

| | | |
|---|---|---|
| 0110208 | 6/1984 | European Pat. Off. . |
| 0543133 | 5/1993 | European Pat. Off. . |
| 329055 | 11/1920 | Germany . |
| 2916261 | 10/1980 | Germany . |
| 3010259 | 9/1981 | Germany . |
| 3243827 | 6/1984 | Germany . |
| 2833731 | 7/1986 | Germany . |
| 3606704 | 9/1987 | Germany . |
| 3842445 | 6/1990 | Germany . |
| 0411880 | 2/1991 | Germany . |
| 4013206 | 11/1991 | Germany . |
| 4111442 | 7/1992 | Germany . |
| 4243156 | 1/1994 | Germany . |
| 176053 | 2/1922 | United Kingdom . |

OTHER PUBLICATIONS

Patents Abstracts of Japan, C-436, Jul. 25, vol. 198, No. 11; "Improvement of Carbonaceous Sludge Cake", Onoda Cement Co. Ltd., Norio Ito, JP-A-6242797.

Theis, K.A.; Braunkohlenkoks in der biologischen Abwasserreinigung und thermischen Klarschlammverbrennung, in UTA Apr. 1992; pp. 246, 248, and 249.

*Primary Examiner*—Robert Popovics
*Attorney, Agent, or Firm*—Sprung Horn Kramer & Woods

[57] ABSTRACT

In the process, the wet sewage sludge originating from a preceding mechanical dewatering is mixed with brown coal, brown coal coke or their mixtures in a weight ratio of sewage sludge to brown coal or its mixtures with brown coal coke of 1:3 to 3:1 and subsequently compacted wet at moderate compaction pressures above 50 bar to dimensionally stable mouldings. The briquetted mouldings can then be fed to a power station boiler as an auxiliary fuel to a thermal utilization or utilized chemically in a pyrolysis or gasification process for the production of fuel gas or synthesis gas.

7 Claims, 1 Drawing Sheet

PROCESS FOR THE UTILIZATION OF SEWAGE SLUDGES

BACKGROUND OF THE INVENTION

The invention is based on a process for the utilization of municipal or industrial sewage sludges with high water contents by briquetting as preparation for a subsequent thermal or chemical processing.

Sewage sludges from municipal or industrial sewage farms arise in large tonnages annually and are disposed of at present by dumping, use in agriculture and also combustion in special sewage sludge incineration plants. Legislation is continually setting more stringent requirements for these methods of disposal, so that e.g. in future the disposal of sewage sludges in agriculture will be permitted only if their mercury content does not exceed a certain upper limit and the mercury content of the soil does not exceed certain limits. Furthermore, the deposition will be very greatly restricted in future by the German Technical Directive on Municipal Waste, which is coming into effect, and made practically impossible by the limitation of the organic component of the deposited product to a maximum of 5%. Because of that, apart from the localized use in agriculture of sludges with fairly low heavy metal contamination, only incineration or chemical-thermal utilization are still available as methods of disposal.

Of these methods, the development of the technique of the monocombustion of sewage sludge is the furthest advanced, but it has the disadvantage that, owing to the usually low calorific values of the sewage sludge, considerable amounts of high-grade fuels such as gas or oil must be fired in addition in order to reach the required combustion temperature. The calorific value of these unavoidably required fuels is also usually utilized within the sludge incineration plants only at a low energy level for the generation of low-pressure steam. The actual combustion is often preceded by a drying stage, which additionally requires energy. Moreover, incineration plants for sewage sludge are very intensive in investment costs. A better possibility, from the viewpoint of energy and of investment costs, for the thermal utilization of sewage sludges consists in the co-combustion in existing power station plants, above all in slag tap fired boilers, wherein at the same time the energy content of the sewage sludge can be utilized at a high energy level. However, this form of utilization makes great demands on the preparation of the sewage sludge, e.g. it must be available either in briquetted or in dry granulated form, the granulation and briquetting always requiring, according to the current state of the art, an upstream drying stage which is intensive in investment and operating costs (DE 4 013 206). The briquetting of sewage sludges, on the other hand, is regarded according to the state of the art and prevailing expert opinion as feasible only for dried sludges below a water content of about 20% (DE 3 606 704). A process is proposed in DE 3 243 827 for briquetting sewage sludges with dried autumn leaves or their extraction residues. This process is unusable for a large-scale industrial process for logistical reasons and because of the tying of the raw material preparation to a particular season.

In DE 3 010 259, a process for the production of briquettes from organic wastes is described.

The disadvantages of the process include the necessity of adding CaO to the briquette composition. An additional substance must therefore be prepared and the calorific value of the briquettes is reduced by contamination of the fuel by inerts. In addition, considerable risks to the boilers occur as a result of Ca deposits and corrosion. A further disadvantage of the process consists in the necessity of applying very high pressures, which causes on the one hand high investment in machinery and on the other hand high operating costs. A further disadvantage of the process, reducing its productivity, consists in the long period of action of the pressure on the material. Further disadvantages consist in the restricted applicability of the process for wastes of all kinds, since these behave quite differently during the moulding. Thus the moulding behaviour of plastics, for example, is not comparable with that of domestic refuse.

The problem therefore arises of discovering a method for the processing of the sewage sludge to a supplementary fuel of low calorific value for further chemical or thermal utilization, which requires only small investment in the downstream utilization plant, which usually already exists for other purposes, puts the sewage sludge into a "suitable form for a power station", enables the sewage sludge to be reliably compacted under all conditions, at the same time avoids an expensive drying of the sewage sludge, as well as permitting a simple logistical handling of the sewage sludge, and dispensing with particular additives and the application of high pressures.

SUMMARY OF THE INVENTION

The problem is solved according to the invention by mixing the wet sewage sludge from the mechanical dewatering system of the sewage farms with dried brown coal with a water content of 10% to 30%, brown coal coke or their mixtures in a weight ratio of sewage sludge to brown coal or its mixtures with brown coal coke of 1:3 to 3:1, preferably 1:2.5 to 2.5:1, and subsequently compacting the mixtures at moderate compaction pressures between 50 bar and 500 bar, preferably between 100 bar and 150 bar, to dimensionally stable mouldings. A "wet sewage sludge" means that the sewage sludge has a water content of 30% to 80%. Dried brown coal with a residual water content of 10% to 30% is obtained by the drying of raw brown coal, whose water content generally lies between 45% and 60%.

The mixture is advantageously heated during the mixing process to temperatures <100° C. and before the mechanical compaction again cooled approximately to room temperature. In this way a deodorization can be achieved. At the relatively low temperatures mentioned, on the other hand, practically no further drying occurs.

Suitable embodiments of the process according to the invention consist in carrying out the mechanical compaction process at moderate pressures in a flat-cavity press (edge mill), a hydraulic press or a roll press.

The brown coal-sewage sludge briquettes so produced can then be utilized directly in a power station as auxiliary fuel or otherwise utilized chemically in a pyrolysis or gasification process for the production of heating or synthesis gas.

It has surprisingly been found that the wet compaction of sewage sludge, contrary to existing expert opinions, which consider the compaction of dry sewage sludge to be possible exclusively below a certain water content of ca. 20%, is according to the invention perfectly possible with brown coal at the mixing ratios proposed; and that the sewage sludge does not, as actually expected, constitute the binder for the briquetting, but that the brown coal itself constitutes the binder of the briquetting process. Control experiments with hard coal gave no positive results.

Despite wet moulding of the sewage sludge, the process according to the invention enables the production of outwardly dry, sufficiently strong mouldings with the highest possible sewage sludge content up to 75%, i.e. with a relatively low calorific value.

The thermal treatment upstream at temperatures below 120° C. of the mixture of coal and sewage sludge produced in the mixing process ensures that, with a good heat transfer to the mixture, the microorganisms and germs present in the sewage sludge, that otherwise lead under anaerobic conditions to a potential subsequent decomposition of the organic substance in the briquette state of the sewage sludge with release of fouling gases, are destroyed.

During this heating, the water content of the mixture remains approximately constant, i.e. no drying occurs.

The wet moulding according to the invention of the sewage sludge with brown coal/brown coal coke and their mixtures is possible at relatively low pressures and simultaneously adequate strength of the briquettes. In the process of mixing the brown coal with the wet sewage sludge, the water from the sewage sludge is apparently to a large extent adsorbed by the brown coal. The sewage sludge can be used in the process, directly and without complicated and expensive drying, in the state in which it normally leaves the mechanical dewatering stages of the sewage forms i.e. with high water contents up to 80%.

Another advantage of the process is the possibly low brown coal content, down as far as to at least 25%, of the coal-sewage sludge mixture or of the briquette produced, which offers advantages in the storage, transport and logistics of the low-calorific-value briquette. In this way the investment and operating costs of the sewage sludge processing plant can be kept relatively low.

A striking advantage of the new process for treating the wet sewage sludge is the elimination of explosion and self ignition hazards, which are normally present, when processing dried sewage sludges.

Figure 1:
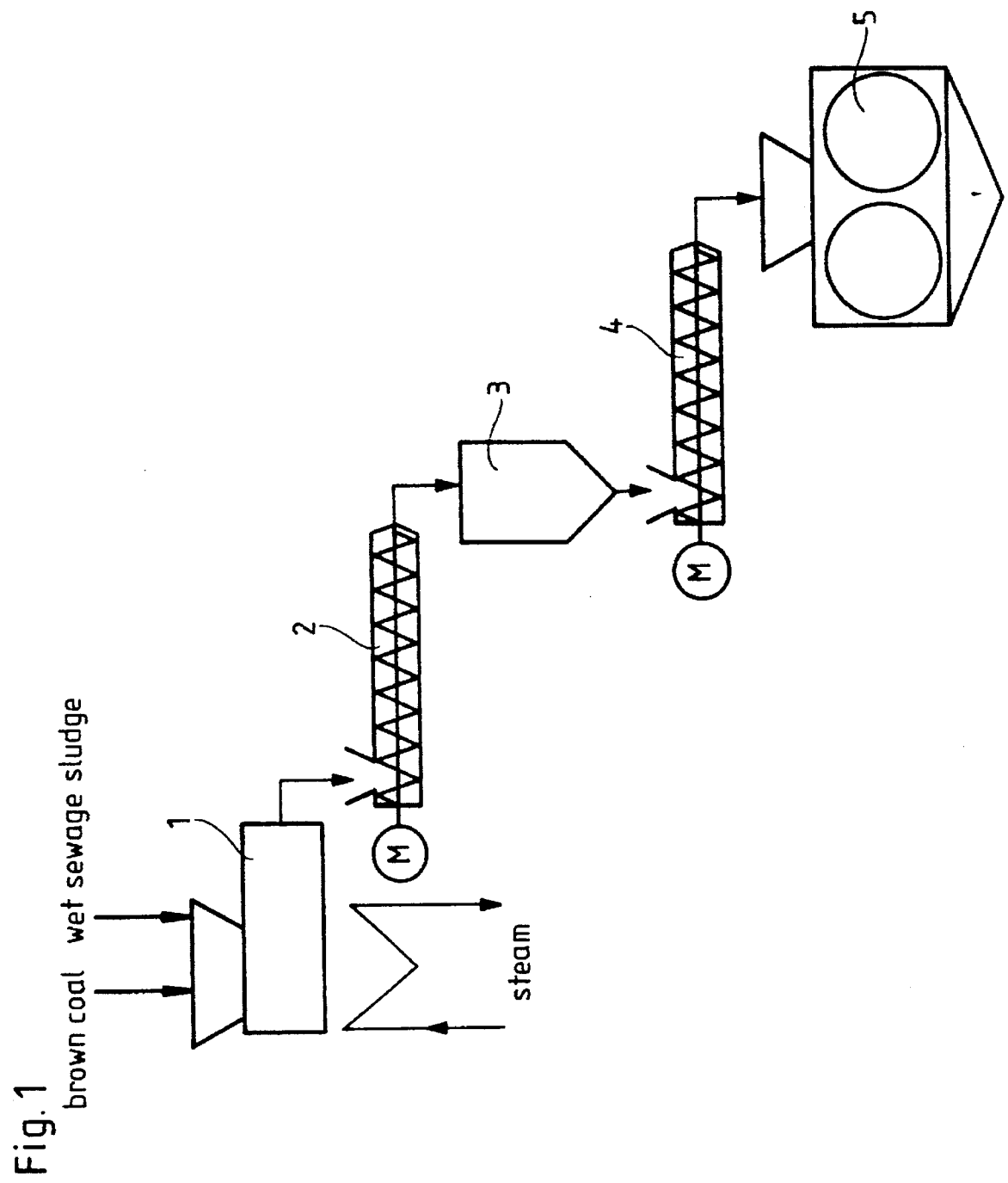
FIG. 1 shows an embodiment for the execution of the process according to the invention. Brown coal with a water content of 15% and an average grain size of less than 1 mm, together with a wet sewage sludge with a water content of 65%, which is available as a filter cake in a chamber filter press, are fed in the ratio 40:60 (brown coal:sewage sludge) to a heated mixing device 1 and, while heat is admitted to the mixing device, are mixed at a product temperature of ca. 80° C. The homogeneous mixture is then fed via a screw conveyor 2 into an intermediate bunker 3, where intermediate storage and cooling of the sewage sludge occurs. The sewage sludge/brown coal mixture, which at this stage is in a flowable state, is then fed, again via a screw conveyor or screw filler 4, to a roll press 5 and processed at moderate compaction pressures of 100 bar to solid briquettes. Despite a high water content, these briquettes have an outwardly dry appearance and a sufficient strength to withstand the processes of transport and transfer without damage.

The mouldings produced in the process can now be fed as a low-caloric auxiliary fuel as an additive to the principal fuel, coal, in the bunkers or to the conveyor belts of a customary coal-fired thermal power station and fired in certain proportions of the boiler heat flow. It is unimportant in this connection whether the power station is fired with brown coal or hard coal, but a flue gas cleaning system such that specific sewage sludge pollutants, such as heavy metals or Cl, can be removed from the flue gas must be available. The combustion in a hard coal fired power station, f. i. in a slag tap fired boiler, envolves the additional advantage, that the brown coal which is present in the sewage sludge briquets improves the ash melting properties in the boiler.

Another possibility of further processing consists in the use of the sewage sludge-brown coal briquettes in pyrolysis and gasification processes. Such processes are used on the large scale for the production of fuel gases and synthesis gases.

We claim:

1. A process for the preparation of fuel briquettes from municipal or industrial sewage sludges comprising the steps of:
    (a) forming a mixture consisting essentially of
        (i) wet sewage sludge having a water content of 30% to 80%, and
        (ii) dried brown coal having a water content of 10% to 30%, either alone or together with brown coal coke,
    wherein the ratio of (i) to (ii) is from 1:3 to 3:1; and
    (b) compacting said mixture, at a compaction pressure above 50 bar, to form a dimensionally stable fuel briquette.

2. Process according to claim 1, wherein the brown coal/sewage sludge mixture is heated during the mixing process to temperatures below 100° C. and is cooled before the mechanical compaction.

3. Process according to claim 1, wherein the wet compaction of the mixture takes place in a flat-cavity press.

4. Process according to claim 1, wherein the wet compaction of the mixture takes place in a hydraulic press.

5. Process according to claim 1, wherein the wet compaction takes place in a roll press.

6. Process according to claim 1, wherein the briquetted mouldings are utilized thermally in a power station boiler as auxiliary fuel.

7. Process according to claim 1, wherein the briquetted mouldings are utilized chemically in a pyrolysis or gasification process for the production of fuel gas or synthesis gas.

* * * * *